Nov. 10, 1959
C. C. HULBERT
2,911,821
METHOD AND APPARATUS FOR THE RAPID DETERMINATION
OF THE CONTENT OF VOLATILE COMBUSTIBLES
AND FLASH POINT OF OILS
Filed Dec. 16, 1955
2 Sheets-Sheet 1
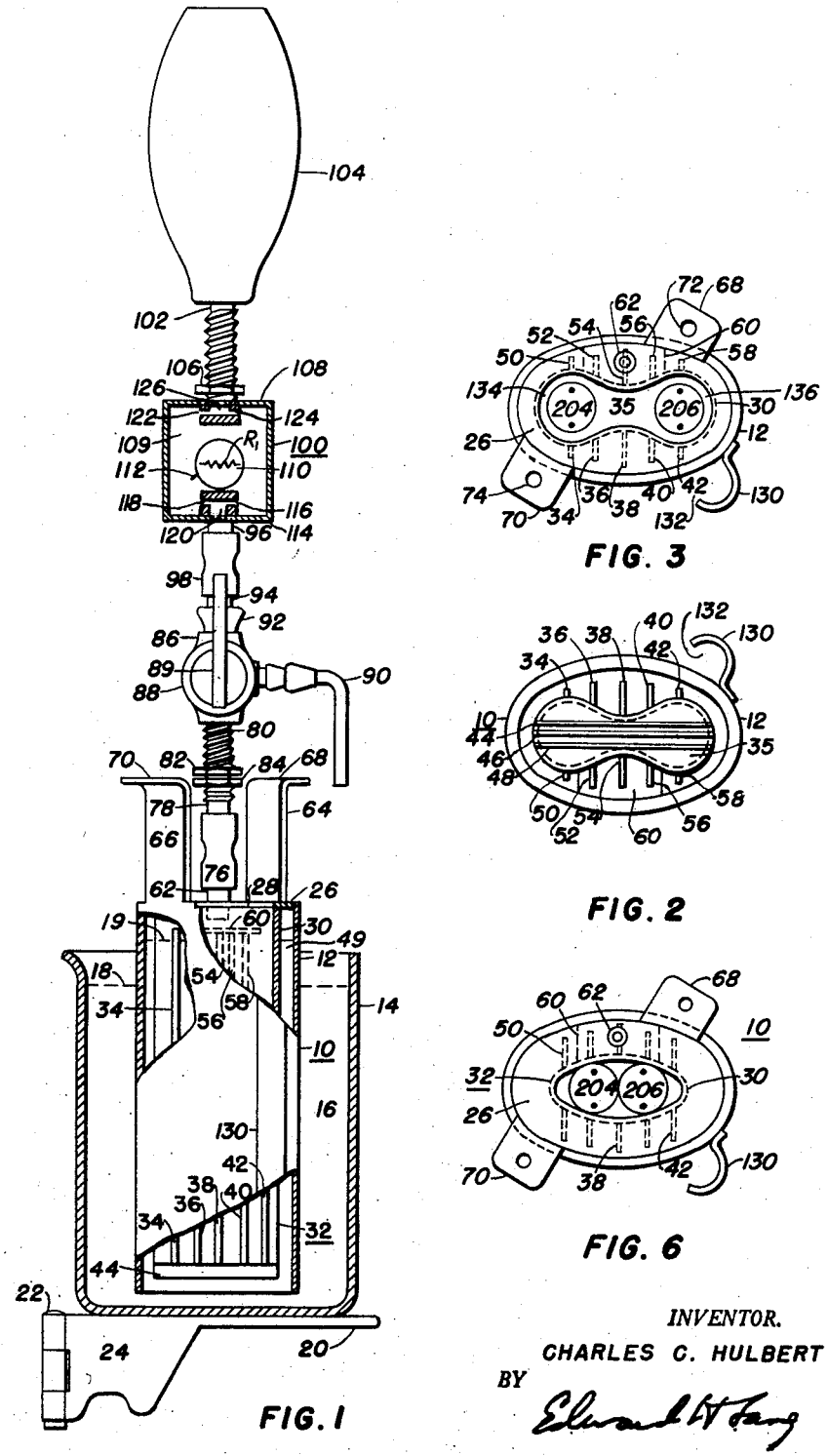
INVENTOR.
CHARLES C. HULBERT
BY
*Edward W Fang*
ATTORNEY Nov. 10, 1959

C. C. HULBERT 2,911,821

METHOD AND APPARATUS FOR THE RAPID DETERMINATION
OF THE CONTENT OF VOLATILE COMBUSTIBLES
AND FLASH POINT OF OILS

Filed Dec. 16, 1955

INVENTOR.
CHARLES C. HULBERT
BY

Edward H Long

ATTORNEY

United States Patent Office 2,911,821
Patented Nov. 10, 1959

2,911,821

METHOD AND APPARATUS FOR THE RAPID DETERMINATION OF THE CONTENT OF VOLATILE COMBUSTIBLES AND FLASH POINT OF OILS

Charles C. Hulbert, Beaumont, Tex., assignor to The Pure Oil Company, Chicago, Ill., a corporation of Ohio Application December 16, 1955, Serial No. 553,499

10 Claims. (Cl. 73—36)

This invention relates to an apparatus for the rapid determination of the flash point of oils or to detect the presence of small amounts of gasoline or other combustible volatile materials present in and contaminating heavier oils.

It is known in the art to use closed cup flash testers to determine the flash point of oils. The use of these testers requires a skilled operator and a draft-free enclosure. In addition, a fuel gas test flame must be available. The time required to make these tests is about 20 minutes and these testers cannot be used on contact with explosive atmosphere. Various combustible meters available will quickly test the atmosphere over a sample and detect increases in light hydrocarbon contamination but these meters are subject to error in that they provide improper stabilization and mixture of the air-vapor mixture and are subject to error from temperature effects and exhaustion of gas sample with testing. They are available flash point testers of the explosion-proof variety but their cost is prohibitive for extended fields of use or installation at loading racks and locations about a refinery or retailers' storage facilities.

The present invention provides a flash point tester which is economical to build, may be used by an unskilled operator with accuracy and reliability, which is explosion-proof and which allows the completion of a test in one to two minutes. Furthermore, the device may be used anywhere a 110 volt current is available or wherever other suitable electric power can be supplied without any enclosure. The present device is free from errors that are inherent in prior art devices of this type and combines the advantages of accuracy and repeatability of results with the rapidity of determination obtainable by a combustion meter. It, therefore, becomes a primary object of the invention to provide a mechanical device for the detection of contamination in heavier oils.

A further object of the invention is to provide an improved design of air-vapor mixing, sample heating and vapor contacting chamber used with a combustible meter to detect contamination and/or the flash points of heavier oils more accurately, swiftly and with reproducibility of results.

These and other objects of the invention will become apparent as the description proceeds.

The invention is best described by reference to the drawings in which,

Figure 1 shows the entire assembly of mechanical parts of the apparatus with the sample chamber shown in partial cut-away and in partial cross-section and the combustion chamber shown in cross-section.

Figure 2 is a bottom view of sample chamber 10.

Figure 3 is a top view of the sample chamber.

Figure 6 is a top view of the sample chamber 10 showing an inner container 32 having an elliptical cross-section as another embodiment of the invention.

Figure 4:
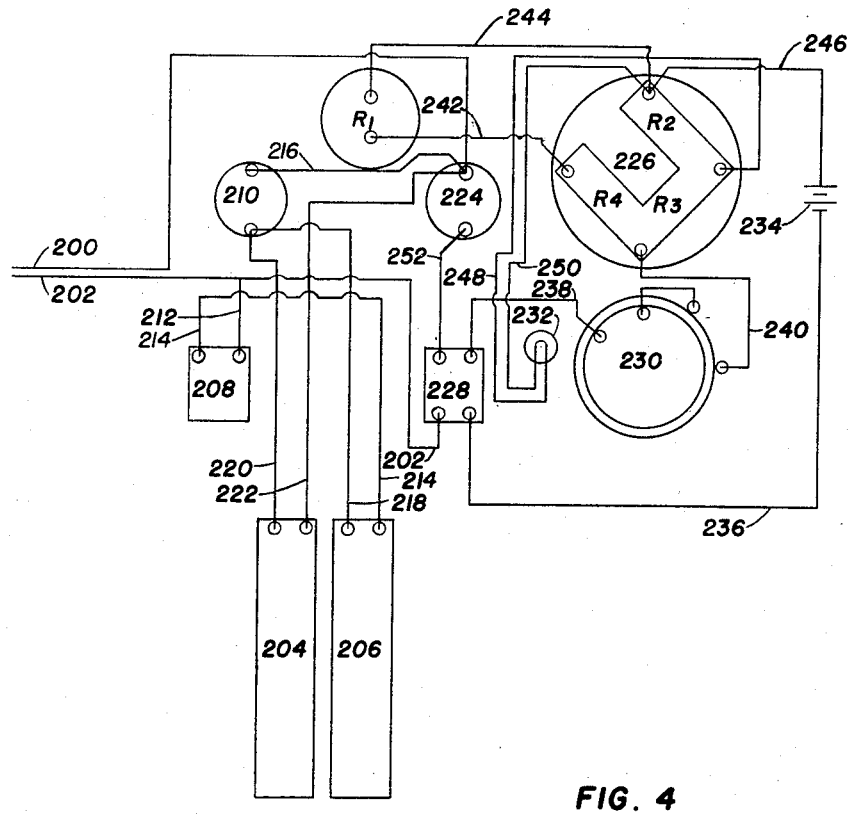
Figure 4 is a diagrammatic lay-out of the apparatus comprising the electrical circuit.

In the drawings, corresponding parts shown in the various figures bear the same numbers. In Figure 1 the assembled mechanical parts of the apparatus are shown. The supporting stand with its fabricated sheet metal box housing and the electrical components, along with the various conduits, toggle switches and rheostat controls have been omitted for simplicity. Also, for greater detail and simplicity the sample chamber 10 has been shown in partial cross-section and in partial cut-away views. The sample chamber 10 and the other component parts of the apparatus are fabricated of brass stock having wall thicknesses ranging from about 0.008 inch to 0.060 inch. The parts may be assembled by any suitable means, as by brazing or soldering, as long as the structure is given sufficient rigidity to withstand ordinary handling and usage in the laboratory or refinery without developing leaks in the vapor conduit system. Sample chamber 10 has an elliptical shape formed by outer wall 12. In Figure 1 a glass beaker 14 is shown in place containing oil sample 16 which assumes liquid level 18 due to the immersion of the sample chamber therein. Beaker 14 is supported by bracket 20 which is pivotally mounted on pin 22 attached to the supporting stand (not shown). Bracket 20 has lobe 24 to facilitate grasping by the hand of the operator to swing the bracket under the bottom of a beaker of sample oil as it is held in place around the sample chamber. To remove the sample it is only necessary to hold the beaker, swing the bracket 20 from thereunder and lower the beaker so that its upper edge may clear the bottom edge of the sample chamber.

The outer wall 12 of sample chamber 10 is open at the bottom and closed at the top by cover member 26. Cover member 26 has a curved opening, the inner peripheral edge of which is shown at 28. Fastened to and extending from peripheral edge 28 of cover member 26 is vertical wall 30 forming inner container 32. Wall 30 of inner container 32 is curved to conform with the curved edge 28 and forms a simple tube having a curved outer surface as shown in Figures 2 and 3 or having elliptical cross section as shown in Figure 6. This curved outer surface carries a plurality of thin vertical parallel fins 34, 36, 38, 40 and 42. These fins extend from the bottom edge of inner container 32 to a point spaced from the top thereof as indicated by fin 34. Several transverse fins of thin brass are provided across the bottom 35 of inner container 32 as indicated by 44, 46 and 48. These fins extend from one side to the other of the bottom 35. Upon immersion of the sample chamber in a sample of oil, the oil is restrained from rising through the open bottom of sample chamber 10 and passing up within the annular space between wall 12 and wall 30 by the pressure of the air or vapor trapped in said annular space and connecting unvented vapor and vapor conduit systems. When the oil sample is subsequently forced to rise into the annular space between walls 12 and 30, its rise is limited by the relative volumes of this space and the volume of rubber bulb 104 and does not rise above the level indicated by line 19 in Figure 1.

The back side of the inner container 32 is also provided with a plurality of thin metal fins which extend from the bottom to the top thereof as represented by fins 50, 52, 54, 56 and 58, shown in dotted lines in Figures 1 and 3, and plainly visible in Figure 2, through the open bottom of chamber 10. Any number of fins may be used on container 30. Vertical arrangement of the fins is preferred as it does not impede the flow of oil or vapors.

The upper ends of back fins 50, 52, 54, 56 and 58 are fastened to the underside of a horizontal baffle 60. This baffle and the small amount of vapor space 49 at the top of sample chamber 10 have the purpose of preventing the liquid from escaping along with vapors as they are removed from the annular vapor space above the liquid level within the sample chamber. The cover member 26 is fitted with a short brass tube 62 which extends into the vapor space 49 and terminates above and spaced from baffle plate 60. The terminus of tube 62 is behind wall 30, therefore, it is shown in dotted lines in Figure 1.

The outer wall 12 of sample chamber 10 has two upwardly-extending supporting members 64 and 66 with end portions 68 and 70 bent at a 90° angle to form a means for fastening the chamber rigidly to the bottom wall of the sheet metal housing which acts as a support for the apparatus. A convenient means of fastening the sample chamber to the supporting stand is by means of brass machine screws inserted through holes 72 and 74 and end portions 68 and 70, which are fastened to a sheet metal housing (not shown) by means of brass nuts soldered to the upper (inner) surface of the bottom of the sheet metal housing. Tube 62 extends from vapor space 49 to within flexible tubing 76 which in turn connects with brass tube 78 having externally threaded portion 80 upon which opposing lock nuts 82 and 84 are placed. Brass tube 78 may pass through the sheet metal housing (not shown) and be firmly held by lock nuts 82 and 84 turned against opposite sides of the edge of the sheet metal opening. Threaded portion 80 of tube 78 is made an integral part of body 86 of three-way gas cock 88. Gas cock 88 has handle 89 shown in "Run" position, as will be explained.

Vent 90 connects from the side of gas cock 88 and when opened to tube 94 permits air to be drawn through combustion chamber 100 by rubber bulb 104 and forced back out through combustion chamber 100 during the operation of zeroing the instrument to be described subsequently. Conduit 92, an integral part of gas cock body 86, terminates in brass tube 94 which is connected to brass tube 96 by flexible tubing 98 leading into combustion chamber 100. Another threaded connecting conduit 102 connects between combustion chamber 100 and compressible hollow rubber bulb 104. A second support for the apparatus is provided by lock nut 106 on the threaded portion of conduit 102 which may be used to engage the sheet metal housing (not shown) of the apparatus against the upper wall 108 of combustion chamber 100. The back side wall 109 of combustion chamber 100 has a circular opening 110 cut therein. The edge is split at 112 and distorted to form a helix adapted to receive the male threaded element of the sensitive resistor element to be described.

Brass tube 96 terminates within combustion chamber 100 and just inside the bottom wall 114. Two apertures 116 and 118 connect through the opposite walls of the brass tube 96 to the inner passage 120. A similar arrangement is provided at the lower end of conduit 102 extending through upper wall 108 wherein passages 122 and 124 communicate with inner passage 126. This arrangement prevents the direct impingement of the vapors on the sensitive resistor element therein.

Referring to Figure 2, showing the open bottom of chamber 10 formed by elliptical wall 12, the bottom and side fins of the inner container 32 are shown. Thermometer well 130 is formed from an elongated piece of thin brass, curved as shown to receive and protect the thermometer. The bottom is open and only one edge of the brass strip is attached to the wall 12 to provide ample circulation of the oil, as through opening 132, around the thermometer body. The thermometer is supported by the walls of the sheet metal housing (heretofore referred to) around the gas cock, combustion chamber and electrical elements.

In Figure 3, a top view of the sample chamber 10 is shown. The inner container 32 has two circular lobes 134 and 136, one of which contains the heating element 204 and the other contains the thermal control switch 206 to maintain constant temperature. The heating element 204 and thermal control switch 206 will be described as part of the electrical system. Since in some instances it is desirable to have the heating element and thermal control switch in contact with each other throughout their length, these elements being in the form of thin-walled metal cylinders, the arrangement in Figure 6 is shown. In Figure 6 only the essential parts are numbered, and inner container 32 has an elliptical cross-section so that elements 204 and 206 can be placed therein in close proximity.

In Figure 4 is shown a physical lay-out view of the apparatus in which lines 200 and 202 represent the source of 110 v., A.C. power to operate the heater 204 under the control of thermal switch 206. Heater 204 may be any type of electrical heater adapted to bring the oil sample to the proper temperature in a short time. For this purpose a suitable type is the Chromalox Cartidge heater, 240 watt, 115 v., A.C. The thermal switch may comprise any type of device adapted to make and break the circuit to control the temperature of the oil within ½° to 1° F. at any selected temperature between about 100° to 150° F. One suitable thermal switch is the Fenwall #7000 10 amp., 115 v. Both of these elements are cylindrical in shape and adapted to fit within the two lobes 134 and 136 of inner container 32 of the sample chamber. Switch 208 controls the heater 204 and thermal switch 206. Pilot light 210 is placed within the circuit to indicate when the heater is turned on. The heater circuit is traced by line 212, leading from line 202 to one pole of switch 208, line 214 leading to one side of thermal switch 206, line 218 leading to pilot light 210, line 220 leading to heater 204, line 222 joining line 200 at pilot light 224 with line 216 from pilot light 210 joining line 200 at pilot light 224.

In Figure 4 the meter circuit insludes meter 226 which is part of a Wheatstone bridge assembly including resistances $R_2$, $R_3$ and $R_4$ and sensitive resistor element $R_1$ located within combustion chamber 100 (Figure 1). pilot light 224, switch 228, rheostat 230, ballast lamp 232 and battery 234. Switch 228 is a double pole switch, one pole being used to connect pilot light 224 to 110 v. line 202 to indicate when the meter circuit is closed and the other pole connecting battery 234 in series between rheostat 230 and meter 226 and the bridge assembly. This circuit is traced by line 236 on one side of the battery and line 238 connected between switch 228 and rheostat 230, line 240 between the rheostat and one side of the meter-bridge assembly, lines 242 and 244 connecting the sensitive resistor element $R_1$ into the bridge and line 246. Ballast lamp 232 is shunted across $R_2$ by lines 248 and 250. The second terminal of switch 228 connects through line 252 to pilot light 224.

Figure 5:
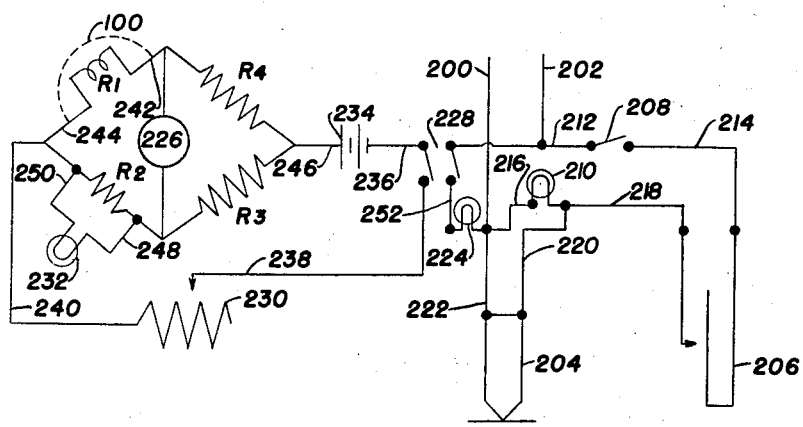
Figure 5 is a schematic wiring diagram.

The general arrangement of these electrical circuits is shown schematically in Figure 5 with corresponding lines and electric components bearing the same numbers as in Figure 4.

Pilot lights 210 and 224 may be 3 watt, 115 v. lamps. The base assemblies may be Dialco type C–431 and the lamps may be type 356 as described in the Allied Radio, 1955 catalog. Switches 208 and 228 are toggle switches, types 8381–K8 SPST and 8360–K7 DPST respectively, as made by Cutler Hammer. Ballast lamp 232 is a product of Mine Safety Appliance Co., type DN 52148 and is fitted in lamp socket for a candelabra with a miniature screw base. $R_1$ is a sensitive element No. DN 11355, as part of a type DN 16386 MSA, Model 2

Explosimeter making up the bridge assembly. Rheostat 230 may be of any type having a capacity suitable to adjust the voltage applied to the bridge assembly to control the resistances of element $R_1$ and ballast lamp 232 to set up a reference condition which is indicated by a "0% explosive" reading on meter 226. A suitable rheostat is the type DN 15613 MSA. Resistors $R_2$, $R_3$ and $R_4$ and meter 226 are calibrated to read from "0 to 100% explosive." The meter 226 used is type or part number DN 11611 and the bridge assembly or resistors are types or parts numbers DN 11529. These elements are components of the Model 2 Explosimeter, DN 16386 MSA. The battery 234 is an ordinary #6 dry cell, having a 1½ volt potential.

The apparatus is operated by turning switch 208, controlling the heater circuit and switch 228, controlling the meter-bridge circuit to "on" position. Both pilot lights are thereby lighted. Pilot light 224 is lighted at all times while the apparatus is in use. Pilot light 210, in the heater circuit is lighted whenever the temperature of the equipment and oil sample being tested is below whatever temperature has been selected as controlled by thermal switch 206. In the work to be described, this temperature was 100° F. The valve handle 89 is turned to "zero" position, wherein conduit 90 connects through the stop cock 88 to conduits 96, combustion chamber 100, conduit 102 and bulb 104. The rubber bulb is squeezed to empty air therefrom and released to allow it to refill with air from the outside. At this time the rheostat 230 is adjusted so that meter 226 reads "0% explosive." This adjustment does not balance the circuit in the conventional sense but alters the temperature and resistances of element $R_1$ and ballast lamp 232 to set up a reference condition which is indicated by a "0% explosive" reading on meter 226. The squeezing of bulb 104 is repeated and the meter reading adjusted once or twice until a steady "0% explosive" is attained.

A 40–45 ml. sample of kerosene or diesel fuel is placed in 150 ml. beaker 14 and the beaker is placed around the sample chamber 10, after which the bracket 20 is swung in place under the beaker. Any previous sample should be allowed to drain into the beaker and be discarded. The beaker may be rinsed with the new sample although this is not essential in routine use, since duplicate runs are easily made to check for possible contamination from the testing equipment.

The valve handle 89 is next turned to "Run" position as shown in Figure 1, and the rubber bulb 104 is slowly squeezed as in the zeroing operation described previously. The "Run" position connects the rubber bulb through the various conduits and combustion chamber 100 to the vapor space above the liquid level 18 and with the annular space between wall 12 and wall 30. The first complete emptying of the bulb will cause the downward displacement of any small amount of sample which has entered chamber 10 and cause air to bubble out through the open bottom thereof into the beaker 14. Subsequent squeezing of the bulb will merely cause the liquid level 18 to rise and fall in the sample chamber. After 8 to 10 squeezes of the bulb the thermometer should read 100–105° F., and the meter 226 is read each time the meter hand comes to rest after release of the bulb. As soon as repeated squeezings of the bulb do not cause a higher meter reading, the maximum reading attained is recorded.

After this, the apparatus is re-zeroed by holding the bulb squeezed empty, turning the valve handle 89 to the "zero" position and repeating the zeroing procedure previously described. If an adjustment of only 1 or 2 "percent explosive" is required to bring the meter to zero, the adjustment value in "percent explosive" may be applied to the test result reading. If a larger adjustment is required, that is 3% or more, the meter is set on zero by adjustment of the rheostat 230 and the bulb 104 is squeezed empty. While holding the bulb 104 empty the valve handle 89 is turned to "Run" position and the test procedure is repeated.

The MSA Explosimeter is used as a quantitative combustible gas detector in the present apparatus. The filament or resistance element $R_1$ is heated to a temperature sufficient to cause redness or glowing upon the application of the electrical current. The platinum resistance element is hot enough, in view of its catalytic property, to ignite air-hydrocarbon mixtures containing low percentage of hydrocarbons. This ignition causes an increase in temperature of the resistance element $R_1$ which increase is reflected in a change in resistance detected by the Wheatstone bridge circuit and shown directly as "percent explosive" by meter 226. The particular arrangement of orifices 116, 118, 122 and 124 within combustion chamber 100 is designed to confine any combustion to the combustion chamber. By manipulation of the bulb 104 the hydrocarbon-air mixture is drawn past the filament and then forced back into the sample chamber 10. Since the combustible air-vapor mixture is confined to the enclosed portion of the device and exposed to ignition only under further confinement to an explosion-proof combustion chamber, the danger of causing an explosion is eliminated.

In order to avoid damage to the testing device certain precautions must be followed. Samples of oil which contain large amounts of gasoline or light naphtha type materials should not be tested. In general, there is no point in testing a sample of fuel oil known to be so contaminated with volatile combustibles as to give a meter reading of 35 or more "percent explosive." While testing such a sample with the device here described is not immediately dangerous, it gives no useful information and tends to shorten needlessly the working life of the sensitive resistance element. It also delays obtaining a true appraisal of the next sample to be tested because it leaves an abnormally large amount of combustibles in the vapor system of the device. The valve handle 89 should not be turned to "zero" position or to "run" position except when the bulb 104 is squeezed empty and held in this position.

The "percent explosive" results obtained by use of the present apparatus are a direct indication of the amount of contamination of diesel fuel, kerosene or gas oil by the presence of lighter hydrocarbons such as those in the gasoline boiling range. The values obtained are, however, coordinated with or may be correlated with the actual flash point of the sample as determined by the conventional Pensky-Martens method or the Tag method, these being well known in the art. To determine the actual Pensky-Martens or Tag flash of a fuel sample before it is sold, it is thus necessary to have determined the conventional flash point on a sample from the source storage tank or other supply and a "percent explosive" reading on the same sample using the device and method here disclosed. With this information available, it is then only necessary to test samples of oil from the same source at the time of sale by the use of the device here disclosed in order to determine the flash point of the oil portion being sold. If a product has a normal flash point of from 160 to 166° F. (Pensky-Martens method) for diesel fuel or 130–136° F. for kerosene, the "percent explosive" for either of these products uncontaminated with lighter hydrocarbons will and should be about 15% or less. The "percent explosive" for kerosene will normally run about 10–15%. For diesel fuels blended with normal proportions of kerosene and gas oil, the value will be about 5 to 10 "percent explosive." Gasoline contamination, through the presence of gasoline having a Reid vapor pressure of 9 to 13 lbs. raises the "percent explosive" by about 5% for each 0.1% contamination. Each 0.1% gasoline contamination has been found to lower the Pensky-Martens or Tag flash points by about 5° F. in the range of 0.0% to 0.4% contamination.

The following table sets up these considerations so that one can predict the approximate flash point in °F. for either diesel fuel or kerosene from the "percent explosive" shown in both the left-hand and right-hand columns.

TABLE I

*Flash of uncontaminated product*

| "Percent Explos." | Diesel Fuel | | | | | Kerosene | | | | | | "Percent Explos." |
|---|---|---|---|---|---|---|---|---|---|---|---|---|
|  | 156 | 158 | 160 | 162 | 164 | 126 | 128 | 132 | 134 | 136 | 138 |  |
| 5 | 152 | 154 | 156 | 158 | 162 | ---- | ---- | ---- | ---- | ---- | ---- | 5 |
| 7 | 150 | 152 | 154 | 156 | 160 | ---- | ---- | ---- | ---- | ---- | ---- | 7 |
| 10 | 148 | 150 | 152 | 154 | 158 | 126 | 128 | 132 | 134 | 136 | 138 | 10 |
| 12 | 146 | 148 | 150 | 152 | 156 | 124 | 126 | 130 | 132 | 134 | 136 | 12 |
| 15 | ---- | 144 | 148 | 148 | 150 | 122 | 124 | 128 | 130 | 132 | 134 | 15 |
| 17 | ---- | ---- | ---- | 150 | 150 | 120 | 122 | 126 | 128 | 130 | 132 | 17 |
| ---- | ---- | ---- | ---- | ---- | ---- | -- | 120 | 124 | 126 | 128 | 130 | 20 |
| ---- | ---- | ---- | ---- | ---- | ---- | -- | -- | 122 | 124 | 126 | 128 | 22 |
| ---- | ---- | ---- | ---- | ---- | ---- | -- | -- | 120 | 122 | 124 | 126 | 25 |
| ---- | ---- | ---- | ---- | ---- | ---- | -- | -- | -- | 120 | 122 | 124 | 27 |
| ---- | ---- | ---- | ---- | ---- | ---- | -- | -- | -- | -- | 120 | 122 | 30 |
| ---- | ---- | ---- | ---- | ---- | ---- | -- | -- | -- | -- | -- | 120 | 35 |

In order to further demonstrate the invention and the repeatability of test results when applying the method and apparatus herein described, the following table gives the test results for fifteen different fuel oil samples which were tested in the conventional Pensky-Martens flash tester and in the apparatus of the present invention using the method set forth.

TABLE II

*Results of flash tests of fuel oil samples*

| Sample Number | Composition of Sample | | | Percent Explosive | Predicted P.M. Flash | Actual P.M. Flashes |
|---|---|---|---|---|---|---|
|  | Percent Normal Diesel Fuel | Percent Extra Kerosene | Percent Gasoline |  |  |  |
| 1 | 55.0 | 45.0 | 0.0 | 13, 13, 11 | ---- | 160, 160 |
| 1a | 54.9 | 45.0 | 0.1 | 19 | 154 | 152 |
| 1b | 54.9 | 44.9 | 0.2 | 23 | 150 | 146 |
| 1c | 54.8 | 44.9 | 0.3 | 26 | 146 | 142 |
| 1d | 54.8 | 44.8 | 0.4 | 30 | 142 | 138 |
| 2 | 85.0 | 15.0 | 0.0 | 8, 10, 10 | ---- | 164, 164 |
| 2a | 84.8 | 15.0 | 0.2 | 24, 24, 24 | 150 | 150 |
| 3 | 70.0 | 30.0 | 0.0 | 11, 12 | ---- | 162, 162 |
| 4 | 0.0 | 100.0 | 0.0 | 18, 15 | ---- | 144, 146 |
| 5 | 100.0 | 0.0 | 0.0 | 10, 10, 9 | ---- | 170, 170, 172 |
| 6 | 99.9 | 0.0 | 0.1 | 15 | 164 | 162 |
| 7 | 99.8 | 0.0 | 0.2 | 25 | 154 | 152 |
| 8 | 99.6 | 0.0 | 0.4 | 31 | 148 | 146 |
| 9 | 99.5 | 0.0 | 0.5 | 42 | 138 | 136 |
| 10 | 99.3 | 0.0 | 0.7 | 57 | 122 | 124 |

In Table II the predicted Pensky-Martens flash point is shown compared with the actual results. These predictions are made by substracting the increase in "percent explosive" from the Pensky-Martens flash point which the corresponding basic sample displayed before it had been contaminated with gasoline. Where more than one test result is shown, as for samples 1, 3, 4 and 5, it indicates results obtained by the same or different personnel on duplicate or triplicate samples of the same composition. In the case of samples 2 and 2a the three sets of results, showing "percent explosive" by the present method and apparatus, represent results obtained by the same personnel on three separate portions of each sample on three successive days to determine the repeatability of the test.

It is recognized that the Mine Safety Explosimeter is capable of analyzing the explosive or combustible properties of a mixture of air and hydrocarbons. The particular features of the method and apparatus of this invention are as follows: A discrete sample of air and hydrocarbon vapor, the latter absorbed from the sample being tested, which contains an amount of hydrocarbon vapor which is proportional to the amount of such vapor in solution in the sample is prepared. This prepared sample of air and hydrocarbon vapor is, at the same time as it is being prepared, subjected to repeated analysis for combustible hydrocarbon content. These results are achieved with a minimum of time and effort and in a consistent and reliable manner. These results are brought about by the cooperation of the three-way gas cock and the rubber bulb connected on each side of the combustion chamber. The simple action of pumping or squeezing the rubber bulb effects several interrelated actions which bring about these results. Manipulation of the bulb causes the liquid sample to rise and fall within the sample chamber to wet the finned surface of the heating member 32. The vapor mixture is also repeatedly brought into contact with the metal fin surfaces wetted by the sample. The vapor mixture is repeatedly forced through the combustion chamber containing the sensitive resistance element $R_1$ of the explosimeter. This cooperating action assures that the vapor phase is in equilibrium with the liquid phase with regard to volatile hydrocarbon content under the heat conditions applied and that the results obtained are true and reliable.

The volume of the rubber bulb 104 is slightly smaller than the net volume of the sample chamber, that is slightly less than the volume of the total annular space between walls 12, wall 30, top 26 and the open bottom of chamber 10. This insures the same air portion being retained in the apparatus throughout the test cycle. This bulb is the single-opening, non-valved type as opposed to one which exerts a one-way pumping action. Equilibrium between the surging vapor and the liquid sample is indicated by the reading of meter 226 which will normally show a series of readings reflecting slight increases with each successive passage of vapor through the combustion chamber until equilibrium is indicated by the same reading on successive passes. In this manner accuracy of results in insured.

It is essential that the heating element 204 maintains a substantially constant temperature during the test procedure. This is accomplished by means of thermal switch 206 connected in series therewith. The assembled apparatus is compact, requires little maintenance and is easy to use. One convenient arrangement is to provide a base with an upwardly extending supporting wall along the back thereof. The beaker support is attached to the bottom of the wall just over the base. The top of the wall supports a housing of sheet metal, such as #18 gauge galvanized iron, for the electrical components. The front panel of the housing contains the meter 226, the control knob for the rheostat 230, the toggle switches and the pilot lights. The handle 89 of three-way gas cock protrudes through the front panel and the "run" and "zero" positions are indicated adjacent the handle on the front panel. The thermometer, which may comprise an ASTM cloud and pour point thermometer reading from —36° to +120° F., protrudes up from the sample chamber through the top of the housing so that the temperature in the region of sample container can be read without removal of the thermometer from its place in the device. The sample chamber and associated conduits, gas-cock and rubber bulb are held to the top and bottom walls of the housing by the machine screws through holes 72 and 74 and the lock nuts 106, and 82 and 84 respectively as indicated in the description of Figure 1.

Although the invention has been described in relation to particular examples, these are not to be construed as limitations and the only limitations attached to this invention appear in the appended claims.

What is claimed is:

1. An analytical apparatus for the rapid determination of the amount of volatile combustible contaminants and the flash point of an oil sample comprising, in combination, means for holding a sample of oil to be tested, an open-bottom chamber adapted to be immersed in said oil sample so that the bottom edge thereof is below the liquid level of said sample, a second chamber within said first chamber and having its outer wall spaced laterally from the inner wall of said first chamber, a cover member extending over the top of the annular space between the spaced walls of said chamber to form an enclosed annular liquid sample and vapor space, an opening in said second chamber to receive means for heating the oil sample to a substantially constant temperature, said second chamber having an enclosed bottom, a plurality of outwardly extending fins attached to said enclosed bottom, a second group of vertical fins extending outwardly from the outer wall of said second chamber into the annular space between the walls of said chambers, said vertical fins extending both above and below the mean liquid level of said oil sample and being wetted throughout their vertical length by rise and fall of the oil sample in the annular space, a valve controlled conduit leading from the uppermost portion of said annular space to an explosion-proof combustion chamber, a second valve-controlled conduit connected to said first mentioned conduit at a point above the valve means therein, means connected to said combustion chamber to expell and take in essentially all of the gaseous phase contents of the aforesaid annular vapor and liquid sample space and means connected to said combustion chamber to determine the content of combustible hydrocarbons therein.

2. An analytical apparatus in accordance with claim 1 in which valve-controlled conduits are controlled by a three-way stop cock, one position of said stop cock connecting said combustion chamber to the atmosphere whereby the gases contained therein may be expelled and air drawn into the combustion chamber, and another position of said stop cock connecting said annular vapor space with said combustion chamber.

3. An analytical apparatus in accordance with claim 1 in which a baffle plate is located just below the opening of said first mentioned conduit within said annular vapor space.

4. An apparatus for determining the amount of volatile combustible constituents in a liquid sample comprising, in combination, a hollow liquid sample container open at its upper end and having a liquid sample level below said open end, a hollow inner chamber within said sample container, said inner chamber being open at its bottom end positioned below said liquid sample level, a transverse annular cover member on the top of said inner chamber, a second chamber within and spaced from said inner chamber, said second chamber being formed by a continuous wall depending downwardly from the inner peripheral edge of said annular cover member, a transverse bottom member enclosing said second chamber at a point substantially adjacent the open end of said inner chamber, heating means within said second chamber, the outside of the wall of said second chamber and the inside of the wall of said inner chamber forming an upper vapor space and a lower liquid-containing space, a vapor conduit extending above and through said cover member and communicating with said vapor space, said vapor conduit communicating at its other end through a three-way valve to a combustion chamber, an enclosed hollow flexible member communicating with said combustion chamber, means within said combustion chamber to determine the content of combustible vapors in said liquid sample produced in said vapor space and conduit by said heating means.

5. An apparatus in accordance with claim 4 in which a baffle is attached within said vapor space transverse to and spaced from the open end of said vapor conduit.

6. An apparatus in accordance with claim 4 in which the total internal volume of said vapor and liquid-containing spaces within said inner chamber is greater than the sum of the internal volumes of said vapor conduit, said three-way valve, said combustion chamber and said hollow flexible member.

7. An apparatus in accordance with claim 4 in which said combustion chamber comprises a housing having opposed vapor inlets and outlets to which said vapor conduit and hollow flexible member are attached, and baffles are attached thereto in transverse and spaced relationship to the flow of vapors therethrough.

8. An apparatus in accordance with claim 4 in which the means to determine the content of combustible vapors comprises a resistance element connected to an electrical circuit as one arm of a Wheatstone bridge, means within said circuit for indicating the change in resistance of said element with change in temperature caused by variations in the rate of combustions of vapors in said combustion chamber and said heating means includes a source of electrical current, a switch connecting said current to a thermal switch in series with an electrical heater element and said heater element and thermal switch are in close proximity within said second chamber.

9. The method for determining the content of volatile components in a liquid sample containing said volatile components which comprises heating a confined sample of said liquid in a heating zone in an oxygen-containing atmosphere to a substantially constant temperature sufficient to vaporize a portion of said volatile components, withdrawing a mixture of said vapors and said oxygen-containing atmosphere to a combustion zone, measuring the change in temperature of said element caused by the combustion of a portion of said mixture, returning said mixture to said heating zone, withdrawing additional portions of said mixture from said heating zone, passing said portions into said combustion zone, measuring the temperature change resulting, and returning said portions to the heating zone, said steps of withdrawing portions of said mixture, passage into said combustion zone and measuring said temperature being conducted in sequence on each portion tested, and recording the highest temperature change produced in said combustion zone by said mixture.

10. The method for determining the content of volatile components in a confined liquid sample containing said volatile components which comprises contacting a sample of said liquid in a heating zone in an oxygen-containing atmosphere, heating said sample to a substantially constant temperature sufficient to vaporize a portion of said volatile components, reducing the pressure on said heating zone so as to withdraw mixtures of said vapors and said oxygen-containing atmosphere and simultaneously cause said liquid to rise repeatedly over hotter portions of said heating zone, passing said withdrawn mixtures in sequence into a combustion zone, measuring the changes in temperature in sequence of said combustion zone caused by the combustion of a portion of each of said mixtures, returning in sequence said mixtures to said heating zone by increasing the pressure thereon after each pressure reduction step to cause said mixtures to contact the liquid-wetted hotter portions of said heating zone left by the falling liquid sample, and recording the highest change in temperature produced by said serially tested mixtures in said combustion zone.

References Cited in the file of this patent

UNITED STATES PATENTS

| | | |
|---|---|---|
| 2,720,108 | Johnson | Oct. 11, 1955 |
| 2,746,286 | Greanias et al. | May 22, 1956 |
| 2,752,776 | Kapff et al. | July 3, 1956 |
| 2,752,777 | Jacobs et al. | July 3, 1956 |

UNITED STATES PATENT OFFICE
CERTIFICATE OF CORRECTION

Patent No. 2,911,821                                      November 10, 1959

Charles C. Hulbert

It is hereby certified that error appears in the printed specification of the above numbered patent requiring corrention and that the said Letters Patent should read as corrected below.

Column 1, line 32, for "They" read -- There --; lines 47 and 48, for "obtainble" read -- obtainable --; column 5, line 62, before "release" insert -- each --; column 10, line 63, strike out "of said element".

Signed and sealed this 19th day of July 1960.

(SEAL)

Attest:

KARL H. AXLINE
Attesting Officer

ROBERT C. WATSON
Commissioner of Patents